(12) United States Patent
Zingg

(10) Patent No.: US 6,983,661 B2
(45) Date of Patent: Jan. 10, 2006

(54) ELECTROMAGNETIC FLOW SENSOR

(75) Inventor: Thomas Zingg, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 16 days.

(21) Appl. No.: 10/839,127

(22) Filed: May 6, 2004

(65) Prior Publication Data

US 2005/0000300 A1 Jan. 6, 2005

Related U.S. Application Data

(60) Provisional application No. 60/472,778, filed on May 23, 2003.

(30) Foreign Application Priority Data

May 15, 2003 (DE) ......................... 103 22 082

(51) Int. Cl.
*G01F 1/58* (2006.01)

(52) U.S. Cl. .................... 73/861.12; 73/861.14
(58) Field of Classification Search ............ 73/861, 73/861.08, 861.11, 861.12, 861.14
See application file for complete search history.

(56) References Cited

U.S. PATENT DOCUMENTS

| | | | |
|---|---|---|---|
| 3,610,040 A | | 10/1971 | Wada |
| 4,459,857 A | * | 7/1984 | Murray et al. ............ 73/861.12 |
| 4,641,537 A | * | 2/1987 | Hansen et al. ............ 73/861.12 |
| 4,774,844 A | * | 10/1988 | Davis ...................... 73/861.12 |
| 5,540,103 A | | 7/1996 | Zingg |
| 5,915,280 A | | 6/1999 | Komatsu et al. |
| 6,595,069 B2 | * | 7/2003 | Frey et al. ............... 73/861.11 |

FOREIGN PATENT DOCUMENTS

| | | |
|---|---|---|
| DE | 3501 768 A1 | 7/1986 |
| EP | 0 895 066 A1 | 3/1999 |
| JP | A 55 126820 | 1/1980 |

\* cited by examiner

*Primary Examiner*—Edward Lefkowitz
*Assistant Examiner*—Takisha Miller
(74) *Attorney, Agent, or Firm*—Bacon & Thomas

(57) ABSTRACT

The flow sensor serves to measure an electrically conductive fluid flowing in a pipe. It comprises a flow tube designed to be inserted into the pipe for conducting the fluid, the flow tube being electrically nonconductive at least on a fluid-contacting inner side, an electrode arrangement consisting of at least two measuring electrodes disposed on the flow tube for picking up a voltage induced in the fluid, and a magnetic field system likewise disposed on the flow tube. The magnetic field system comprises at least two saddle-shaped field coils for producing a magnetic field cutting the fluid during operation of the flow sensor, a respective ferromagnetic pole piece for each of the two field coils, as well as at least one ferromagnetic return path extending around the flow tube upstream of the two field coils and at least one ferromagnetic return path extending around the flow tube downstream of the two field coils for directing the magnetic field around the flow tube. The pole pieces are magnetically coupled to the return paths by means of ferromagnetic coupling elements. Each of the, preferably identically shaped, coupling elements has at least one essentially trough-shaped cover segment which receives a first winding section of the respective associated field coil, lying essentially on a first periphery of the flow tube, or a second winding section of the associated field coil, lying essentially on a second periphery of the flow tube.

7 Claims, 2 Drawing Sheets

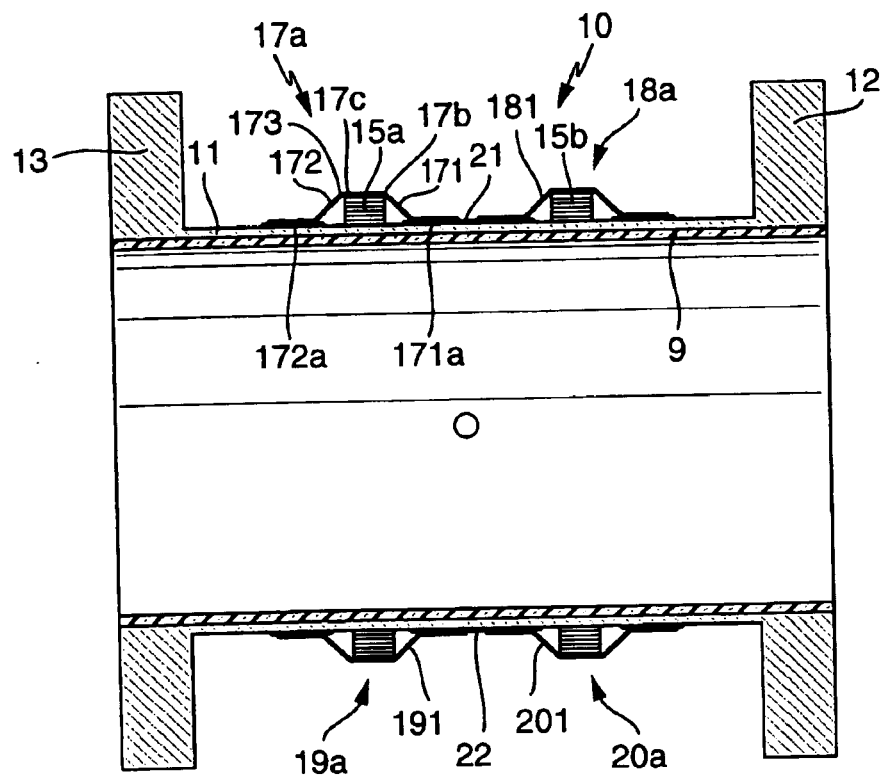
Fig. 2
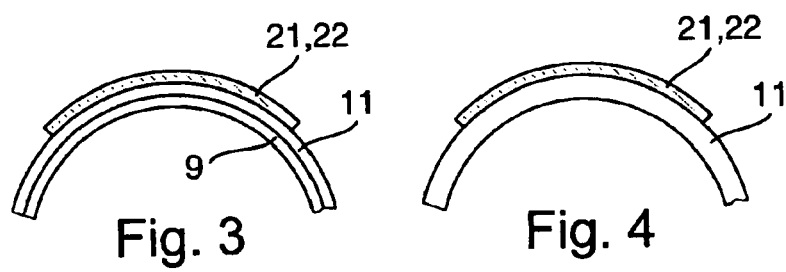
Fig. 3  Fig. 4
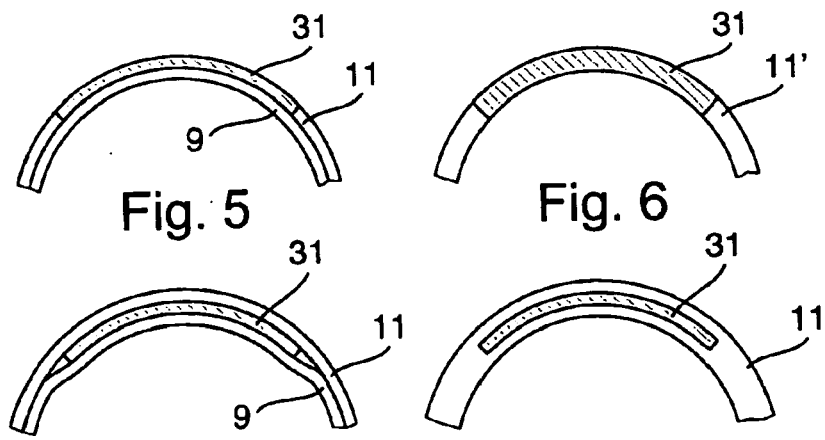
Fig. 5  Fig. 6
Fig. 7  Fig. 8

ELECTROMAGNETIC FLOW SENSOR

FIELD OF THE INVENTION

This invention relates to an electromagnetic flow sensor comprising a flow tube, through which flows an electrically conductive fluid to be measured, and saddle coils serving to produce a magnetic field cutting the fluid.

BACKGROUND OF THE INVENTION

For the purposes of the description of the invention, "flow sensor" means the essentially mechanical portion of an electromagnetic flowmeter without the coil-current-generating circuit. Such electromagnetic flow sensors, as is well known, use Faraday's law of induction to produce a measurement voltage.

In DE-A 20 40 682, U.S. Pat. No. 4,641,537, U.S. Pat. No. 4,774,844, or WO-A 91/11731, different implementations of electromagnetic flow sensors are described, which serve to measure an electrically conductive fluid flowing in a pipe. The flow sensors shown each comprise:

a flow tube designed to be installed in the pipe for conducting the fluid, the flow tube being electrically nonconductive at least on a fluid-contacting inner surface;

an electrode arrangement comprising at least two measuring electrodes disposed on the flow tube for picking up a voltage induced in the fluid; and a magnetic field system likewise disposed on the flow tube and comprising at least a first and a second saddle-shaped field coil for producing a magnetic field which in operation cuts the fluid essentially transversely, particularly at right angles, to a longitudinal axis of the flow tube, and a ferromagnetic first pole piece for the first field coil and a ferromagnetic second pole piece for the second field coil for directing the magnetic field toward the fluid.

While the respective magnetic field systems of the flow sensors disclosed in WO-A 91/11731 have two ferromagnetic return paths for controlling the magnetic field distribution which are disposed at the sides of the field coils and are magnetically coupled to the pole pieces, and which extend annularly and parallel to each other around the flow tube, each of the flow sensors in DE-A 20 40 682, U.S. Pat. No. 4,641,537, and U.S. Pat. No. 4,774,844 is shown having two centrally disposed ferromagnetic return paths magnetically coupled to the pole pieces, these centrally extending return paths being implemented as comparatively thin sheet-metal strips.

Furthermore, at least in the flow sensor shown in U.S. Pat. No. 4,641,537, each of the pole pieces is connected with the return paths by two, likewise comparatively thin, ferromagnetic coupling elements, each of which has a coil-core- and yoke-forming cover segment. These cover segments at least partially cover respective first and second winding sections of the field coils which extend parallel to each other and to the longitudinal axis of the flow tube.

The advantages of such magnetic field systems using saddle-shaped field coils in conjunction with predominantly thin-walled elements controlling the magnetic field distribution outside the flow tube, as is also apparent from U.S. Pat. No. 4,641,537, lie in the comparatively low material expenditure and in their high efficiency. Consequently, such flow sensors, apart from being inexpensive to manufacture provide high measurement accuracy along with a comparatively great operable flow range. Furthermore, the flow sensors can be of a very compact design, at least in the radial direction.

Investigations of such flow sensors have shown, however, that the above-mentioned advantageous properties are found primarily in flow sensors with flow tubes of comparatively small nominal diameter. In the case of pipes with great nominal diameters, and thus at correspondingly great diameters of the flow tube, the necessary measurement accuracy or the desired sensitivity, as also discussed in U.S. Pat. No. 5,540,103, for example, could be achieved with conventional flow sensors using saddle-shaped field coils only by increased material expenditure, particularly by an increased amount of copper for the field coils. In addition it turned out that at great nominal diameters, where the ratio of nominal diameter to flow-tube length is generally greater than for small nominal diameters, the spread of the magnetic field in the axial direction may no longer be negligible.

To reduce variations in measuring sensitivity which may be associated with a spreading of the magnetic field to the connected pipe as frequently occurs with great nominal diameters, many manufacturers recommend grounding measures, for example, which the user is to take when installing the flow sensor. For example, grounding washers are commonly used between the flow sensor and the connected pipe. Another possibility of reducing such dependences of the measuring sensitivity on the mounting conditions is to make the flow tube, but at least the nonconductive portion of the same, sufficiently long in the axial direction and/or, as also indicated in U.S. Pat. No. 5,540,103, for example, to use cylindrical field coils, thus making the field coils and pole pieces comparatively short in the axial direction, albeit at the expense of operable flow range.

SUMMARY OF THE INVENTION

It is therefore an object of the invention to improve electromagnetic flow sensors having saddle-shaped field coils, which are advantageous for the operable flow range, in such a way that at comparatively large ratios of nominal diameter to flow-tube length, particularly in the range greater than 0.6, and in the nominal-diameter range above 100 mm, but at least above 500 mm, a comparatively high and substantially stable measuring sensitivity can be achieved while retaining a wide operable flow range. In addition, the flow sensor is to be as compact as possible in both the radial and axial directions.

To attain the object, the invention provides an electromagnetic flow sensor for measuring an electrically conductive fluid flowing in a pipe, the flow sensor comprising a flow tube for conducting the fluid which is designed to be inserted into the pipe and is electrically nonconductive at least on a fluid-contacting inner surface, an electrode arrangement consisting of at least two measuring electrodes disposed on the flow tube for picking up a voltage induced in the fluid, and a magnetic field system likewise disposed on the flow tube. The magnetic field system of the flow sensor according to the invention comprises at least a saddle-shaped first field coil and a saddle-shaped second field coil for producing a magnetic field cutting the fluid during operation of the flow sensor, a ferromagnetic first pole piece for the first field coil and a ferromagnetic second pole piece for the second field coil for directing the magnetic field towards the fluid, and at least a ferromagnetic first return path, extending around the flow tube upstream of the two field coils, and at least a ferromagnetic second return path, extending around the flow tube downstream of the two field coils, for directing the magnetic field around the flow tube. The first pole piece is magnetically coupled to the first return path by means of at least a ferromagnetic first coupling element and to the second return path by means of at least a ferromagnetic second coupling element, while the second pole piece is magnetically coupled to the first return path by means of at least a ferromagnetic third coupling element and to the second return path by means of at least a ferromagnetic fourth coupling element. Each of the, preferably identically shaped, coupling elements comprises an essentially trough-shaped cover segment which receives a first winding section of the respective associated field coil, which lies essentially on a first periphery of the flow tube, or a second winding section of the respective associated field coil, which lies essentially on a second periphery of the flow tube.

In a first embodiment of the invention, at least one of the coupling elements has at least a first connecting region, which serves to effect magnetic coupling with the respective associated pole piece and contacts at least part of the surface of this pole piece.

In a second embodiment of the invention, at least one of the coupling elements has at least a second connecting region, which serves to effect magnetic coupling with the respective associated return path and contacts at least part of the surface of this return path.

In a third embodiment of the invention, each of the two, particularly diametrically opposed, field coils, has an essentially rectangular cross section.

In a fourth embodiment of the invention, the winding section received by the trough-shaped cover segment of the first coupling element forms a first side of the cross section of the first field coil, and the winding section received by the trough-shaped cover segment of the second coupling element forms a second side of the cross section of the first field coil.

In a fifth embodiment of the invention, each of the cover segments has at least one essentially circular-arc-shaped edge.

In a sixth embodiment of the invention, the coupling elements are also essentially saddle-shaped.

A basic idea of the invention is to achieve, by a suitable arrangement of saddle-shaped field coils and magnetic return paths in combination with preferably flat coupling elements, and with shielding comparable to that used in conventional flow sensors, a control of the magnetic field distribution which is essentially independent of the actual mounting conditions and, thus, very well suited for calibration. Thus, low leakage inductances are obtained for the flow sensor according to the invention in an advantageous manner, particularly in comparison with conventional flow sensors with nominal diameter/flow-tube length ratios greater than 0.6 and nominal diameters above 500 mm. Another advantage of the invention lies in the fact that despite the extensive shielding of the magnetic field, short field buildup times and, thus, a great operable flow range can be achieved.

As the magnetic field is effectively limited in the axial direction, the flow sensor according to the invention can be fitted with a comparatively short flow tube even at great nominal diameters, so that it can also be made very compact in the axial direction.

BRIEF DESCRIPTION OF THE DRAWINGS

The invention and advantages will become more apparent from the following description of embodiments when taken in conjunction with the accompanying drawings. Like parts are designated by like reference characters throughout the various figures of the drawings. Reference characters which were already introduced have been omitted in subsequent figures in order to avoid redundancy. In the drawings:

FIG. 2 is a sectional side view of the flow sensor of FIG. 1;

FIGS. 3, 4 are schematic cross-sectional views of arrangements of pole stampings on an external surface of a flow tube suitable for the flow sensor of FIG. 1;

FIGS. 5, 6 are schematic cross-sectional views of arrangements of pole regions fitted in a wall of a flow tube suitable for the flow sensor of FIG. 1; and FIGS. 7, 8 are schematic cross-sectional views of arrangements of pole stampings on an internal surface of a flow tube suitable for the flow sensor of FIG. 1.

DETAILED DESCRIPTION OF EXEMPLARY EMBODIMENTS

Figure 1:
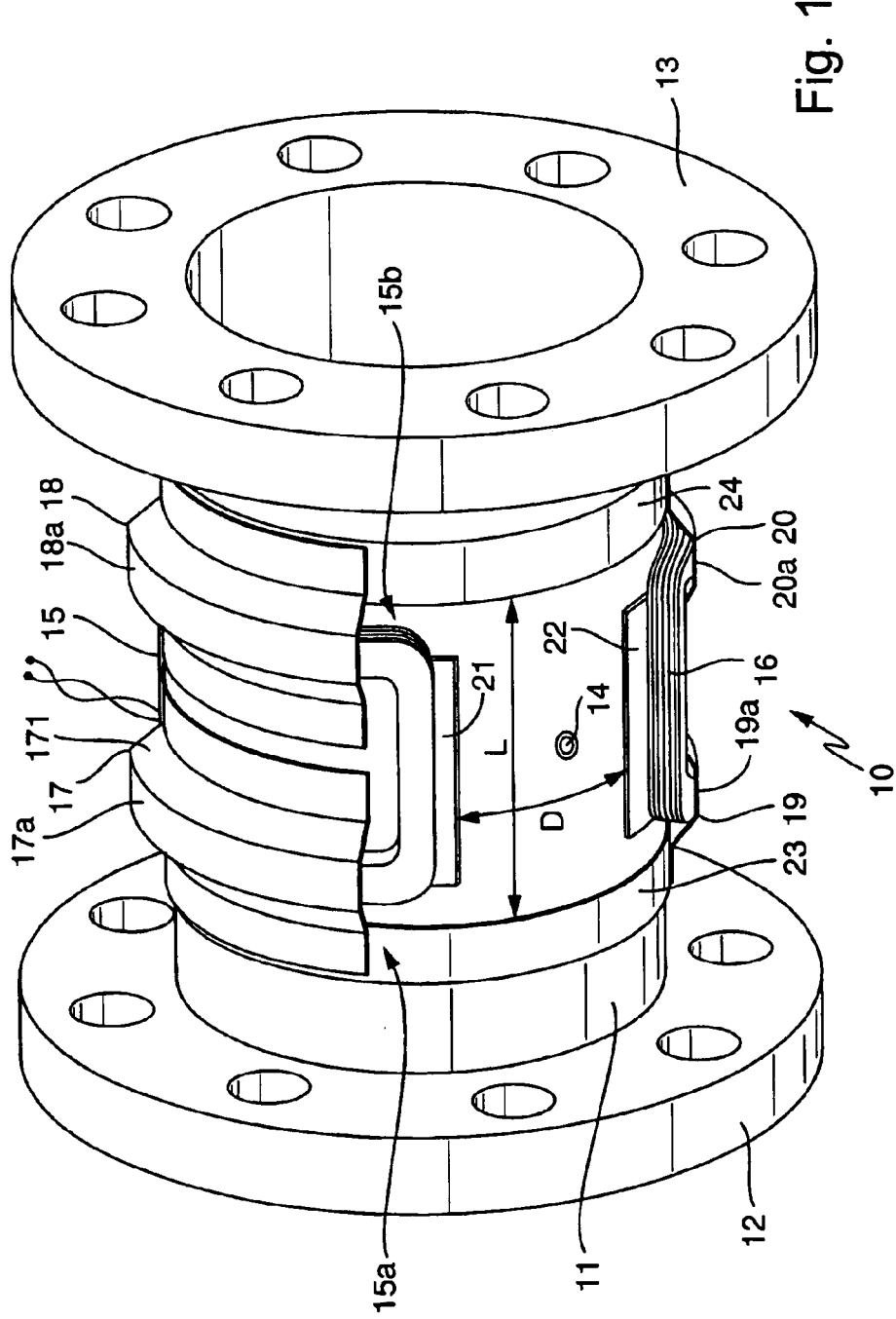
FIG. 1 is a perspective view of an electromagnetic flow sensor designed to be inserted into a pipe for measuring a fluid flowing in the pipe.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

The electromagnetic flow sensor 10 shown schematically in FIGS. 1 and 2 is particularly suited for measuring an electrically conductive fluid flowing in a pipe (not shown) having a nominal diameter in the range between 200 and 700 mm, particularly between 350 and 600 mm. To conduct the fluid, the flow sensor has a flow tube 11 designed to be inserted into the pipe. Flow tube 11 may be made of nonferromagnetic metal, such as stainless steel, of a suitable ceramic, such as alumina ceramic, or of a suitable plastic, such as hard rubber.

If flow tube 11 is a metal tube, its inner surface is lined with an electrically nonconductive insulation 9, e.g., an insulation of polyfluoroethylene, particularly polytetrafluoroethylene, of soft rubber, or of hard rubber, so that the signals induced by the magnetic field will not be short-circuited by the metallic flow tube 11, cf. FIG. 2, 3, 5, or 7.

In the embodiment shown, flow tube 11 is provided with flanges 12, 13, via which flow sensor 10 can be installed in the pipe in a fluid-tight manner. Instead of the flanges, screwed fittings or hose connections as are commonly used in the sanitary and food industries are possible. Also possible are flangeless connections through axial compression between pipe and flow tube, particularly if a ceramic or plastic flow tube is used.

Mounted on or in the wall of flow tube 11 are, preferably two, measuring electrodes which are disposed at diametrically opposed positions, for example, and of which only one, 14, is visible in FIG. 1. If the measuring electrodes are to come in contact with the fluid, i.e., if they are galvanic measuring electrodes, each of them will be installed in a hole in the wall of flow tube 11; if the latter is a metal tube, they must be isolated from the same. In the case of capacitive measuring electrodes, there is to be no contact with the fluid, so that the electrodes have to be isolated from the fluid. It is possible to provide further measuring electrodes as well as ground electrodes and monitoring electrodes, such as electrodes for monitoring the level of the fluid.

The measuring electrodes can be connected to conventional evaluation electronics (not shown) which convert the signal picked up by the measuring electrodes to a signal representative of the volumetric flow rate. Numerous prior-art circuits suitable for this purpose are described in the extensive literature.

Mounted on the flow tube 11 or at least partly in the wall thereof is a magnetic field system for producing a magnetic field cutting the flow tube 11, preferably in a direction perpendicular to the diameter joining the electrodes and perpendicular to a longitudinal axis of flow tube 11, and for controlling the distribution of this magnetic field.

To produce the magnetic field, the magnetic field system comprises a saddle-shaped first field coil 15 and an opposite, saddle-shaped second field coil 16. Field coils 15, 16 are preferably oblong-flat and essentially rectangular in cross section. If necessary, however, they may also have a different cross-sectional shape, such as a circular or oval one. Methods suitable for the manufacture of the saddle-shaped field coils are described, for example, in EP-A 768 685.

In the embodiment shown, the two field coils 15, 16 are disposed on flow tube 11 at diametrically opposed positions, namely as close to the external surface of flow tube 11 as possible. Moreover, the two field coils 15, 16 are so disposed on flow tube 11 that a respective principal axis of each field coil 15, 16 is essentially normal to the longitudinal axis of flow tube 11, i.e., that this axis also runs in the direction of a radius of the cross-sectional area of flow tube 11. If necessary, particularly if more than two field coils are used, the latter may also be disposed on flow tube 11 in another suitable manner.

The magnetic field is produced by means of an excitation current which is generated by a conventional coil current generator circuit and fed into the field coils. This can be done by using the numerous prior-art circuits described in the literature.

To direct the magnetic field toward the fluid, the magnetic field system comprises a ferromagnetic first pole piece 21 for field coil 15 and a ferromagnetic second pole piece 22 for field coil 16. In the embodiment shown in FIGS. 1, 2, 3 or 4, each of the two pole pieces 21, 22 is implemented in the form of a likewise saddle-shaped pole stamping, an external surface of which is adapted to the saddle shape of a respective contact area of the associated field coil 15, 16. The two pole stampings are disposed on the external surface of flow tube 11 in the manner familiar to those skilled in the art; thus, as viewed in the circumferential direction, they extend on both sides of the respective coil 15, 16, maintaining a sufficient distance D between their ends. The pole stampings may also be so disposed on the external surface of flow tube 11 as to be positioned essentially only in the clear cross section of the associated field coil 15, 16, thus extending beyond the respective field coil 15, 16 neither in the axial direction nor in the circumferential direction. In FIG. 1, only the respective front portions of the pole stampings 21, 22 can be seen; their rear, equally large portions are hidden. Soft magnetic material, such as transformer sheet or the like, is preferably used for the pole stampings.

To control the magnetic field distribution outside the fluid to be measured and to direct the magnetic field around the flow tube, the magnetic field system comprises at least a ferromagnetic first return path 23. In addition, a second ferromagnetic return path 24 is provided for directing the magnetic field around the flow tube. Return path 23, as shown in FIG. 1, is disposed upstream of the two field coils 15, 16 and the pole pieces 21, 22, and return path 24 is disposed downstream of the two field coils and the pole pieces. In the embodiment shown, each of the two return paths 23, 24 is advantageously implemented as a soft magnetic sheet stamping resting essentially directly on the external surface of flow tube 11 and preferably extending parallel to the respective other sheet stamping. In other words, the two return paths 23, 24 are implemented here as closed rings or hoops resting on the outside of and embracing the flow tube 11. A, particularly essentially unchanging, distance L between the return path stampings 23, 24 preferably ranges between 0.3 and 0.7 times, particularly between 0.4 and 0.6 times, the nominal diameter of flow tube 11. The thickness of return path stampings 23, 24 in the radial direction is preferably chosen to be between approximately 1 and 5 mm.

While FIG. 1, as briefly mentioned above, shows the arrangement of the pole stampings 21, 22 on the external surface of flow tube 1, FIGS. 5, 6, 7 and 8 illustrate another possibility of implementing the pole pieces, namely in the form of pole regions 31. In FIG. 5, the metallic flow tube 11 is shown with the pole region 31 fitted, e.g., welded or soldered, in its wall. In FIG. 6, where flow tube 11 is of ceramic, the pole region 31 is a magnetically conductive ceramic region. Each of these pole regions may be formed by admixing suitable metal powders during the manufacture of flow tube 11. FIG. 7 shows the arrangement of a pole stamping 31 on the inner surface of the metallic flow tube 11, with the pole stamping, like flow tube 11, separated from the fluid by the insulation 9. FIG. 8 shows the corresponding case for a plastic flow tube 11, where the pole stampings are embedded in the plastic.

The different variants of the arrangement and implementation of the pole stampings illustrated by FIGS. 3 to 8 can be applied analogously to the return path stampings. This is not shown, because their arrangement can be readily implemented by those skilled in the art.

As shown in FIGS. 1 and 2, pole piece 21 is magnetically coupled to return path 23 by means of at least a ferromagnetic first coupling element 17 and to return path 24 by means of at least a ferromagnetic second coupling element 18.

To optimize the control of the field distribution, particularly to minimize the spread of the magnetic field in the direction of the longitudinal axis of flow tube 11, coupling element 17 has at least one essentially trough-shaped or gutter-shaped cover segment 17a which extends along a first winding section 15a of field coil 15, lying essentially on a periphery of flow tube 11, and which receives and covers at least this winding section 15a or a corresponding first segment of the first field coil 15. For this purpose, cover segment 17a of coupling element 17 comprises a pole-piece-side first wall 171 and a return-path-side second wall 172 which are connected with one another by a covering third wall 173 disposed above field coil 15, such that the two walls 171 and 172 are spaced a sufficient distance apart. This distance is preferably greater than 30 mm.

The walls 171, 172, and 173 are preferably so shaped and arranged relative to each other that cover segment 17a has an essentially U- or V-shaped cross section or, as shown in FIG. 2, a trapezoidal cross section.

Coupling element 17 may advantageously be formed from comparatively thin sheet metal, for instance by cold working.

In a embodiment of the invention, an essentially circular-arc-shaped first edge 17b of cover segment 17a is formed by the two walls 171, 173. A likewise circular-arc-shaped second edge 17c of cover segment 17a is formed by the two walls 172, 173. This second edge 17c runs essentially parallel to the first edge 17b, preferably so that the wall 173 is essentially coaxial with flow tube 11. Coupling element 17 is preferably also essentially saddle-shaped.

As shown in FIGS. 1 and 2, both the pole-piece-side wall 171 and the return-path-side wall 172 are advantageously provided with contact areas 171a and 172a, respectively. The two contact areas 171a and 172a are so designed that, when placed on pole piece 21 and return path 23, respectively, they fit an associated opposite contact area 21a of pole piece 21 and an associated opposite contact area 23a of pole piece 23, respectively, as accurately as possible.

As shown in FIG. 1, coupling element 18 comprises a cover segment 18a which is comparable to cover segment 17a. Cover segment 18a extends along a second winding section 15b of field coil 15, lying on a periphery of flow tube 11, and receives and covers at least this second winding section 15b or a corresponding second segment of field coil 15. As can be easily seen, the pole-piece-side wall 171 of cover segment 17a and a corresponding pole-piece-side wall 181 of cover segment 18a form a region of a magnetic field system which is comparable to a conventional coil core or coil form. In a similar manner as pole piece 21, the second pole piece 22 is magnetically coupled to the return paths 23, 24 provided on flow sensor 10. Accordingly, the magnetic field system further comprises at least a ferromagnetic third coupling element 19 for pole piece 22 and return path 23, particularly an element identical in shape to the first coupling element 17, which has at least one trough-shaped cover segment 19a for a first winding section of the second field coil 16. A fourth coupling element 20 with a trough-shaped cover segment 20a for a second winding section of the second field coil 16, particularly an element identical in shape to the second coupling element 18, is provided for magnetically coupling pole piece 22 to return path 24.

As indicated in FIGS. 1 and 2, a respective width of the coil-core-forming walls 171, 181, 191, 201 in the radial direction is slightly greater than a height of the field coils 15, 16. Furthermore, the coil-core-forming walls 171, 181 and 191, 201 are positioned in field coils 15 and 16, respectively, at a given distance from each other.

In another embodiment of the invention, each of the two cover segments has a length equal to at least one fourth of a side length of the associated field coil 15, 16. Preferably, the length of the two cover segments is chosen to be as great as possible.

In a further embodiment of the invention, each of the first and second coupling elements 17, 18 is integrally formed.

In a still further embodiment of the invention, both coupling elements 17, 18 are formed from a common sheet-metal part, so that a yoke thus formed and serving to magnetically couple the two return paths 23, 24 to pole piece 21 is essentially of one-piece construction.

According to a development of this embodiment of the invention, pole piece 21 is integrated into the yoke, i.e., it is formed integrally with the two coupling elements 17, 18.

In another embodiment of the invention, the two coupling elements 17, 18 are at least mirror-symmetrical with respect to each other; however, they may also advantageously be identically shaped.

In a further embodiment of the invention, the coupling elements 17, 18, 19, 20 provided for the magnetic field system are essentially identical in shape. Furthermore, coupling elements 17, 18, 19, 20 are preferably formed from the same material, such as transformer sheet or the like.

The pole stampings 21, 22 and/or the return path stampings 23, 24 as well as the coupling elements 17, 18, 19, 20 can be implemented not only in the form of individual sheet-metal parts but also in the form of sheet packets as are commonly used in transformers or electric motors. These sheet packets consist of two or more stacked laminations of soft magnetic material with a width chosen to obtain the low reluctance required, such as of grain-oriented sheet stampings whose surface is provided with a thin electrically insulating layer. Thus, the individual laminations of the sheet packet are electrically isolated from each other, whereby eddy-current losses are greatly reduced.

One aim of all embodiments is to form a closed magnetic circuit from the pole stampings or regions through the coil cores to the return path stampings or regions which has as low a reluctance as possible.

The electromagnetic flow sensor is finally provided with an enclosure (not shown), such as a magnetically shielding metal casing, which surrounds the flow tube 11, the magnetic field system, and the measuring electrodes. The enclosure may be filled with a filler, e.g., with foam material.

While the invention has been illustrated and described in detail in the drawings and forgoing description, such illustration and description is to be considered as exemplary and not restrictive in character, it being understood that only exemplary embodiments have been shown and described and that all changes and modifications that come within the spirit and scope of the invention as described herein are desired to be protected.

What is claimed is:

1. An electromagnetic flow sensor for measuring an electrically conductive fluid flowing in a pipe, comprising:
    a flow tube, designed to be inserted into the pipe, for conducting the fluid, the flow tube being electrically nonconductive at least on a fluid-contacting inner side;
    an electrode arrangement comprising at least two measuring electrodes disposed on the flow tube for picking up a voltage induced in the fluid; and
    a magnetic field system likewise disposed on the flow tube,
    said magnetic field system including at least a saddle-shaped first field coil and at least a saddle-shaped second field coil for producing a magnetic field cutting the fluid during operation of the flow sensor, a ferromagnetic first pole piece for said saddle-shaped first field coil and a ferromagnetic second pole piece for saddle-shaped second field coil for directing the magnetic field towards the fluid, and at least a ferromagnetic first return path, extending around the flow tube upstream of the two field coils, and at least a ferromagnetic second return path, extending around the flow tube downstream of the two field coils, for directing the magnetic field around the flow tube,
    said ferromagnetic first pole piece being magnetically coupled to said ferromagnetic first return path by means of at least a ferromagnetic first coupling element and to said ferromagnetic second return path by means of at least a ferromagnetic second coupling element, and said ferromagnetic second pole piece being magnetically coupled to said ferromagnetic first return path by means of at least a ferromagnetic third coupling element and to the said ferromagnetic second return path by means of at least a ferromagnetic fourth coupling element, wherein each of said ferromagnetic coupling elements comprises at least one essentially trough-shaped cover segment which receives a first winding section of the respective associated saddlle-shaped field coil, lying essentially on a first periphery of the flow rube, or a second winding section of the respective associated saddle-shaped field coil, lying essentially on a second periphery of the flow tube.

2. The electromagnetic flow sensor as claimed in claim 1, wherein at least one of said ferromagnetic coupling elements has a connecting portion which serves to effect magnetic coupling with the respecting associated ferromagnetic pole piece and contacts at least part of the surface of said associated ferromagnetic pole piece.

3. The electromagnetic flow sensor as claimed in claim 1, wherein at least one of said ferromagnetic coupling elements has a connecting portion which serves to effect magnetic coupling with the respective associated ferromagnetic return path and contacts at least part of the surface of said associated ferromagnetic return path.

4. The electromagnetic flow sensor as claimed in claim 1, wherein each of said two saddle-shaped field coils has an essentially rectangular cross section.

5. The electromagnetic flow sensor as claimed in claim 1, wherein said first winding section received by said existing trough-shaped cover segment of said ferromagnetic first coupling element forms a first side of the cross section of said saddle-shaped first field coil, and wherein said first winding section received by said trough-shaped cover segment of said ferromagnetic second coupling element forms a second side of the cross section of said saddle-shaped first field coil.

6. The electromagnetic flow sensor as claimed in claim 1, wherein said trough-shaped cover segments each have at least one essentially circular-arc-shaped edge.

7. The electromagnetic flow sensor as claimed in claim 1, wherein said ferromagnetic coupling elements are also essentially saddle-shaped.

* * * * *